(12) United States Patent
Ferchland et al.

(10) Patent No.: US 9,246,605 B2
(45) Date of Patent: Jan. 26, 2016

(54) RECEIVER AND METHOD FOR THE RECEPTION OF A NODE BY A RECEIVER IN A WIRELESS NETWORK

(71) Applicant: Atmel Corporation, San Jose, CA (US)

(72) Inventors: Tilo Ferchland, Dresden (DE); Rolf Jaehne, Ottendorf-Okrilla (DE); Frank Poegel, Dresden (DE); Eric Sachse, Leipzig (DE)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 14/257,473

(22) Filed: Apr. 21, 2014

(65) Prior Publication Data

US 2014/0315508 A1 Oct. 23, 2014

Related U.S. Application Data

(63) Continuation of application No. 13/182,286, filed on Jul. 13, 2011, now Pat. No. 8,705,670.

(60) Provisional application No. 61/374,096, filed on Aug. 16, 2010.

(30) Foreign Application Priority Data

Aug. 16, 2010 (DE) .......................... 10 2010 034 521

(51) Int. Cl.
*H04L 27/06* (2006.01)
*H04B 17/00* (2015.01)
(Continued)

(52) U.S. Cl.
CPC .......... *H04B 17/0057* (2013.01); *H04B 1/7073* (2013.01); *H04B 17/318* (2015.01); *H04L 7/042* (2013.01); *H04W 4/008* (2013.01); *H04W 24/00* (2013.01)

(58) Field of Classification Search
USPC .......... 375/316, 324, 340, 342–343, 355, 362
See application file for complete search history.

(56) References Cited

U.S. PATENT DOCUMENTS 6,134,283 A 10/2000 Sands
6,657,579 B2 * 12/2003 Tsunehara et al. .............. 342/47
(Continued)

FOREIGN PATENT DOCUMENTS

CN 101292457 10/2008
CN 101657004 2/2010
(Continued)

OTHER PUBLICATIONS

Chinese First Office Action and English Translation of Text of First Office Action and Search Report by State Intellectual Property Office regarding Application No. 201110250941.7; ref. 2014072801186220 dated Jul. 31, 2014, 14 pgs.; date of issuance: Jul. 31, 2014.
(Continued)

*Primary Examiner* — Khanh C Tran
(74) *Attorney, Agent, or Firm* — Fish & Richardson P.C.

(57) ABSTRACT

In one embodiment, a method includes receiving a radio frequency (RF) signal; synchronizing the received RF signal with a preamble to determine a time base; determining a first energy value of the received RF signal by averaging received signal strength indication (RSSI) values of the received RF signal over a first period of time; determining a second energy value of the received RF signal over a second period of time; determining a difference value between the first energy value and the second energy value; comparing the difference value with a predetermined energy threshold value; determining a quality value of the received RF signal; comparing the quality value of the received RF signal with a predetermined quality threshold value; and, if the difference value exceeds the predetermined energy threshold value or the quality value is below the predetermined quality threshold value, then erasing the time base.

22 Claims, 4 Drawing Sheets

(51) Int. Cl.
*H04B 1/7073* (2011.01)
*H04L 7/04* (2006.01)
*H04W 4/00* (2009.01)
*H04W 24/00* (2009.01)
*H04B 17/318* (2015.01)

(56) References Cited

U.S. PATENT DOCUMENTS

| | | | |
|---|---|---|---|
| 6,894,996 B2 * | 5/2005 | Lee | 370/337 |
| 7,245,687 B2 * | 7/2007 | Chang | 375/376 |
| 7,304,969 B2 | 12/2007 | Ryan et al. | |
| 7,623,897 B1 | 11/2009 | Elliott | |
| 8,705,670 B2 | 4/2014 | Ferchland et al. | |
| 8,781,037 B2 * | 7/2014 | Xu et al. | 375/343 |
| 2005/0185737 A1 * | 8/2005 | Yamauchi | 375/316 |
| 2005/0220230 A1 * | 10/2005 | Fukuda | 375/343 |
| 2005/0272375 A1 | 12/2005 | Ramesh | |
| 2007/0230403 A1 | 10/2007 | Douglas et al. | |
| 2009/0175163 A1 | 7/2009 | Sammour | |
| 2009/0327889 A1 | 12/2009 | Jeong | |
| 2010/0177664 A1 | 7/2010 | Thoumy et al. | |

FOREIGN PATENT DOCUMENTS

DE 102010034521.0-31 8/2010
WO 01/22649 A1 3/2001

OTHER PUBLICATIONS

Office Action for German Patent Application No. 10 2010 034 521.0 and English Translation, Apr. 4, 2011.

"Part 15.4: Wireless Medium Access Control (MAC) and Physical Layer (PHY) Specifications for Low-Rate Wireless Personal Area Networks (WPANs)," IEEE Std 802.15.4™-2006, Sep. 8, 2006.

Ferchland et al., U.S. Appl. No. 13/182,286, Notice to File Corrected Application Papers, Jul. 26, 2011.

Ferchland et al., U.S. Appl. No. 13/182,286, Response to Notice to File Corrected Application Papers. Aug. 30, 2011.

Ferchland et al., U.S. Appl. No. 13/182,286, Non-Final Rejection. Jul. 15, 2013.

Ferchland et al., U.S. Appl. No. 13/182,286, Response to Non-Final Rejection. Oct. 15, 2013.

Ferchland et al., U.S. Appl. No. 13/182,286, Notice of Allowance. Nov. 26, 2013.

Ferchland et al. U.S. Appl. No. 13/182,286, Issue Notification. Apr. 2, 2014.

* cited by examiner

RECEIVER AND METHOD FOR THE RECEPTION OF A NODE BY A RECEIVER IN A WIRELESS NETWORK

RELATED APPLICATIONS

This application is a continuation, under 35 U.S.C. §120, of U.S. patent application Ser. No. 13/182,286, filed 13 Jul. 2011 and entitled "Receiver and Method for the Reception of a Node by a Receiver in a Wireless Network," which claims the benefit, under 35 U.S.C. §119(e), of U.S. Provisional Patent Application No. 61/374096, filed 16 Aug. 2010, and which also claims the benefit, under 35 U.S.C. §119(a), of German Patent Application No. 102010034521.0-31, also filed 16 Aug. 2010.

TECHNICAL FIELD

This disclosure relates to a receiver and a method for the reception of a node by a receiver in a wireless network.

BACKGROUND

In particular embodiments, a wireless personal area network (WPAN) is a network for wirelessly interconnecting devices around an individual person's workspace.

DESCRIPTION OF EXAMPLE EMBODIMENTS

Figure 1:
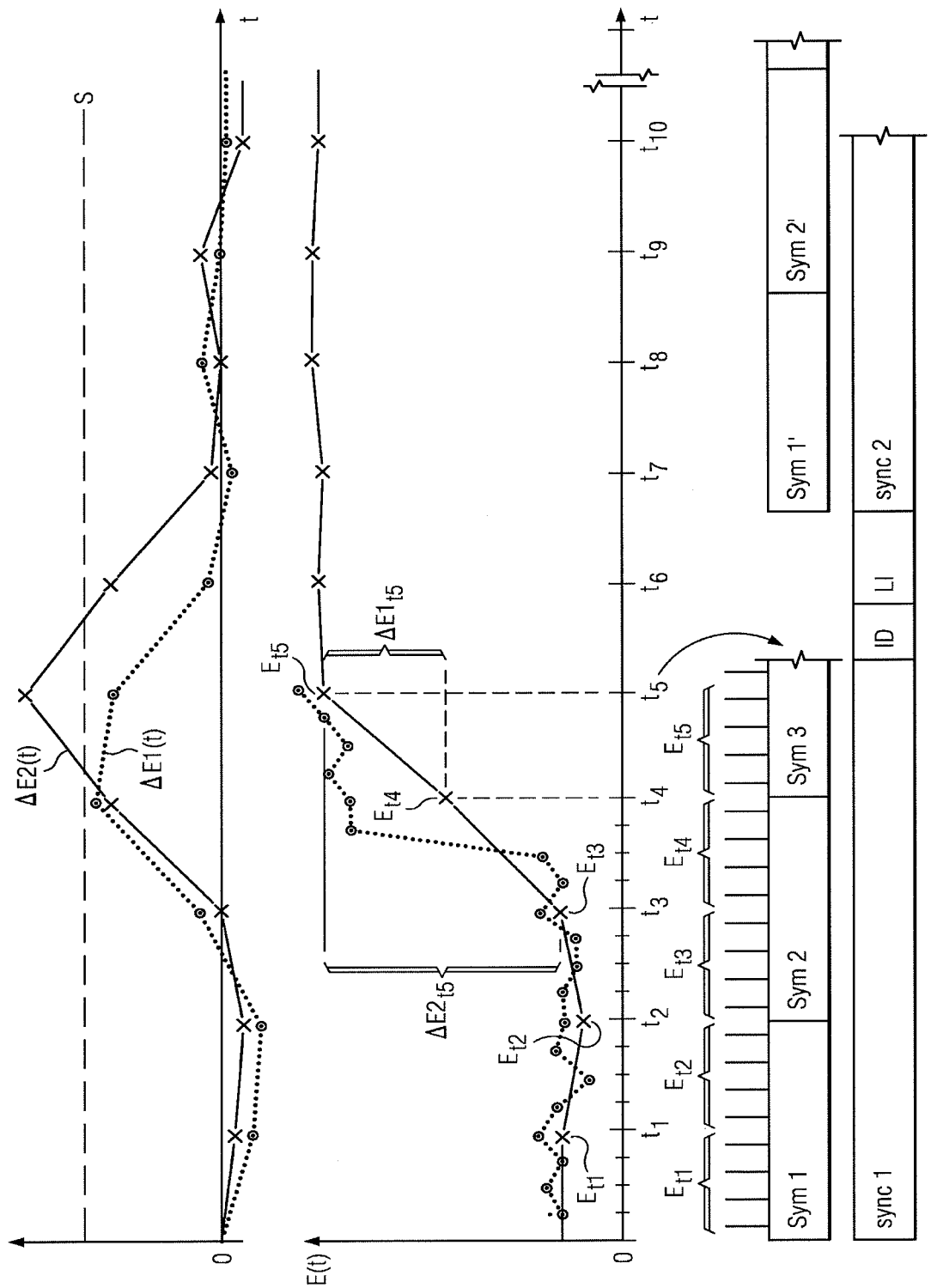
FIG. 1 is a schematic diagram with example energy values determined.

This disclosure relates to a receiver and a method for the reception of a node by a receiver in a wireless network.

The industrial standard IEEE 802.15.4 describes a specification for a low-rate wireless personal area network (WPAN). The wireless network normally has multiple nodes with respectively one transceiver device for communication of the nodes among one another. Each transceiver device has a transmitter and a receiver.

In particular embodiments, the transmitter of a transmitting node of a wireless network converts the data stream to be transmitted pursuant to the IEEE 802.15.4 industrial standard into a radio signal to be emitted via an antenna. The data stream to be transmitted is initially converted into so-called symbols, wherein each symbol is assigned exactly one value with a fixed bit width, such as four bits. The symbols are converted into consecutive symbol value-specific sequences, in particular psuedonoise (PN) sequences, with a number of binary chips. In this context, exactly one sequence is assigned to each symbol. A symbol is defined by a sequence with a sequence of 32 chips, for example. A 4-bit wide transmission is defined by 16 different symbols, for example, wherein 16 different PN sequences are provided accordingly. In this context, the temporal length of a symbol corresponds to the duration of the transmission of all chips of the assigned PN sequence, wherein the first and the last chip of a PN sequence is adjacent to the front or rear limit of the symbol in each case.

The consecutive PN sequences are subsequently modulated by the transmitter, are spectrally shifted into one of the communication channels, and are finally amplified for the transmission.

In particular embodiments, the transmitted radio signal is received by a receiver of a receiving node by means of an antenna. The receiver converts the received signal from the radio signal error-free to the extent possible into the data pursuant to the specifications of the IEEE 802.15.4 industrial standard, in that the received signal may be filtered by the receiver, transformed into the baseband, demodulated, and the data are detected, among other things. If band spreading on the transmission side occurs with the help of sequences on the transmission side, then the band spreading is undone on the receiver side by a corresponding de-spreading using sequences on the side of the receiver. Each sequence on the receiver side is assigned to a sequence on the transmitter side, from which it is derivable or may even be identical with it. The received signal is correlated using known PN sequences on the receiver side by means of a correlator, for example. If the chips of the sequences on the transmitter side adopt the two logical values Zero and One or, equivalent thereto, the two antipodic values ±1, then sequences are normally also used in the receiver, the chips of which adopt exactly to different values, e.g. Zero and One or ±1.

A frame structure for the standard-compliant transmission is disclosed in industry standard IEEE 802.15.4-2006, page 21, 43. A frame has a synchronization header (SHR) with a preamble and with a start-of-frame delimiter (SFD) frame alignment word and data fields.

The SHR makes it possible for the receiver to synchronize itself for the reception of the subsequent data. The receiver uses the preamble to perform at least one chip synchronization and one symbol synchronization on the incoming received signal. The synchronizations performed create a time basis in the synchronized condition of the receiver, wherein the receiver may receive subsequent data by means of the time base. Data fields in the received signals follow the SFD frame alignment word, the data of said data fields may be demodulated and detected by means of the time base.

For detection of the symbols contained in the received signal or for determination of symbol boundaries, the SHR contains a known sequence on the receiving side, such as a PN sequence, in the form of the preamble. Based upon the preamble, the time base with sampling instants of the chips and with the symbol boundaries are determined in the receiver.

For the synchronization on the receiver side, the received signal may initially be supplied into a cross-correlation filter, for example, which performs a cross-correlation between the received signal and the preamble. The output signal of the cross-correlation filter has periodic maximum values that point out a correlation maximum in each case. A cross-correlation maximum is created with complete or almost complete overlapping of the preamble contained in the received signal and the preamble on the receiving side that was used for cross-correlation. Therefore, based upon the correlation maximums, which may be detected by means of a threshold value detector, for example, conclusions with respect to the respective symbol boundary are possible, for example.

Particular embodiments provide a method for a receiver to receive a node in a wireless network that permits robust reception to the extent possible.

Particular embodiments provide a method for receiving a node by a receiver in a wireless Network. The wireless network has two nodes, for example, one node to transmit the radio signal and one node to receive the radio signal. The method relates to the reception by the receiver receiving the node, wherein one received signal is created from the radio signal that is received via an antenna.

A first time base is determined by means of synchronization. The synchronization may comprise multiple parts. Suitable sampling instances with respect to the chips or symbol boundaries or a time offset or a frequency offset are determined for the first time base by means of the synchronization. The first time base therefore creates the temporal reference for the detection of data that succeed the preamble.

In particular embodiments, oversampling of the received chips of the received signal is performed. Suitable sampling instances of the chips are located by correlating a preamble for synchronization that is contained as part of the received signal by means of a synchronization correlator with a known preamble on the receiver side. For this purpose, the synchronization correlator is aligned to the preamble. Synchronization is performed using the maximum values of the correlation. By means of the maximum values of the correlation and the oversampling, symbol boundaries of the received symbols of the frame are moreover determined. In addition, a synchronization in particular is performed within the frame by means of an SFD frame alignment word, wherein the SFD frame alignment word has a clearly defined position within the frame for this purpose.

The first time base that is determined using the synchronization enables the receiver to determine the data which succeed the frame alignment word of the frame.

In particular embodiments, a first energy value of the received signal is determined during the reception of the frame by the receiver. In addition, during the reception of the frame, a second energy value of the received signal is determined continuously. The first energy value and the second energy value are respectively assigned to a signal field strength of the radio signal. The second energy value is determined temporally after the first energy value, i.e. temporally disjunct to the first energy value. The first energy value and the second energy value are stored in a memory for further evaluation.

From a difference of the second energy value and the first energy value, a difference value is determined. The difference value is compared with a threshold. The threshold is a temporally constant threshold value or a temporally variable value, for example, which is compared with the difference value. The threshold in the receiver is predetermined and is at least stored temporarily. Alternatively, the threshold is determined using previous temporal energy values. In order to compare the difference value with the threshold, a bigger/smaller comparison may be performed, for example.

In particular embodiments, a quality value of the received signal is determined continuously during the reception of the frame. The quality value is a measure for interferences such as signal distortion in the communications channel. Signal distortions may be caused by interference or multipath propagation, for example. Minor interferences produce a large quality value, and vice versa. The quality value depends less on the energy value than on the previously mentioned interferences in the communications channel. The quality value results from a comparison of the received signal with the expected signal form on the receiver side, something that may be determined by correlation, for example.

The quality value in particular embodiments is a value of a signal-to-noise ratio, or a value that is determined from a correlator output signal of a correlator. In this context, the correlator on the receiver side correlates known PN sequences with the chips of the received signal that are assigned to the symbols, in order to determine the transmitted data. The quality value is compared with a quality threshold.

The quality threshold is a temporally constant quality threshold value or a temporally variable value, for example, which is compared with the quality value. The quality threshold is determined by the receiver and stored temporarily. The quality threshold may be determined using (definite) previous temporal quality values, for example. In order to compare the quality value with the quality threshold, a bigger/smaller comparison may be performed, for example.

During the reception of the frame, the first time base is erased and a renewed synchronization for determination of a second time base is started, if, according to particular embodiments, the threshold of the difference value is exceeded, or if, according to other particular embodiments, the quality value drops below the quality threshold. In this context, the reception of the frame is aborted before the said frame is completed.

It is possible to alternatively use or to combine the comparison of the difference value with the threshold, according to particular embodiments, and the comparison of the quality value with the quality threshold, according to other particular embodiments. For purposes of combination, the result of the comparison of the difference value with the threshold and the result of the comparison of the quality value with the quality threshold are linked logically. The results may be arranged for OR operation, for example, so that the erasure of the first time base and a renewed synchronization may then be performed, if the difference value of the threshold is exceeded or if the quality value drops below the quality threshold. Using embodiments of the combined evaluation has the advantage that an evaluation is also possible if an energy jump occurs even with very small energy values, because of the ever-present noise and the inadequate correlation resulting therefrom. The energy value may exceed the threshold because of stray radiation from a source such as a microwave, for example, where the correlation may also be very small, so that the quality value may drop below the quality threshold. In these cases, the reception of the current frame is aborted.

In particular embodiments, using a technical design of the previously discussed method, such as discussed in greater detail in connection with the figures achieves the advantage of significant improvement in the reception of frames in a wireless network, wherein a more robust transmission is achieved also in wireless networks where interferences are present or which are heavily used. In a wireless network with heavy interference which is heavily occupied, it may therefore occur that during the reception of the current frame, a frame with higher energy or a heavier interference may affect the currently received frame to the extent that the frame data may no longer be decoded without errors. In this case, continued reception of the current frame is futile and the reception process is aborted. The frame with higher energy may be received, however.

Particular embodiments indicate a receiver of a node of a wireless network that is improved to the extent possible.

Particular embodiments provide a receiver of a node of a wireless network for receiving a received signal. The node may have a transmitter and a data processor, such as a microcontroller. In this context, the particular embodiments relate to the receiver of the node. The receiver has at least one digital circuit, one synchronization unit, and one evaluation device. In addition, the receiver may have further components for the reception of the received signal, such as amplifiers, filters, mixers, analog/digital converters, and the like.

The digital circuit is set up for detection of received data of a frame of the received signal. For this purpose, the digital circuit in particular embodiments has a correlator on the receiver side for the cross correlation of known sequences with the chips in the received signal.

The synchronization unit is set up to determine a first time base by synchronization. For this purpose, the synchronization unit has in particular a synchronization correlator for cross correlation of a preamble in the received signal with a known preamble on the receiver side. The digital circuit is set up to detect the received data of the frame by using the first time base.

In particular embodiments, the evaluation device is set up for controlling the digital circuit and the synchronization unit. For this purpose, control outputs of the evaluation device may be connected with at least one control input of the digital circuit and with at least one control input of the synchronization unit.

In particular embodiments, the evaluation device is set up to determine a first energy value of the received signal during the reception of the frame, to continuously determine a second energy value of the received signal, to identify a difference value from a difference of the second energy value and the first energy value, and to compare the difference value with a threshold. The evaluation circuit may be set up to erase the first time base and to control the determination of a second database, if the difference value exceeds the threshold.

In particular embodiments, the evaluation device is set up to continuously determine a quality value of the received signal during the reception of the frame and to compare the quality value with a quality threshold. The evaluation circuit is set up to erase the first time base and to control the determination of a second database, if the quality value drops below the quality threshold.

Particular embodiments may be individually applied for this purpose. A combined set up of the evaluation device is also possible, wherein both the difference value with the threshold as well as the quality value with the quality threshold are compared.

Particular embodiments described below relate to a method for reception and to a receiver.

In particular embodiments, Received Signal Strength Indication (RSSI) values of a signal field strength are formed. The first energy value and the second energy value are determined by averaging a number of RSSI values for the signal field strength of the radio signal. The first energy value is determined by averaging of four consecutive RSSI values for the signal field strength, for example.

In particular embodiments, the second energy value may be determined at a constant time interval to the first energy value. In particular embodiments, the first energy value and the second energy value are determined continuously in a shifting time window. The boundaries of the time window are defined by a fixed number of energy values within the time window.

In particular embodiments, at least two difference values are determined for at least two first energy values. For this purpose, the first two energy values are assigned to different times. The two first energy values are successive, for example. Each of the at least two difference values is compared with the threshold. The results of the comparison for the at least two difference values are evaluated by means of a logic. In particular embodiments, the results of the comparison are linked for OR operation by the logic.

In particular embodiments, the quality value and the quality threshold are determined using quality measuring values. The quality measuring values may be determined using an output signal of a correlator. A quality measuring value is determined for exactly one transmitted symbol, for example.

The quality measuring value is a maximum of the output signal of the correlator, for example.

In particular embodiments, multiple quality measuring values are continuously determined in a shifting time window. The boundaries of the time window may be defined by a fixed number of quality measuring values within the time window.

Particular embodiments are advantageous both individually as well as in combination with each other.

Particular embodiments relate to the IEEE 802.15.4 industrial standard, but particular embodiments may also be used for other wireless networks with multiple nodes. For this purpose, each node may have a transmitter/receiver device with one transmitter and one receiver, respectively. Particular embodiments refer to the receiver of a node and a method for reception through the receiver of the node.

The receiver converts the received signal formed from the radio signal pursuant to the specifications of the IEEE 802.15.4 industrial standard into the transmitted data, in that the received signal is filtered by the receiver, transformed into the baseband, demodulated, de-spread, and the data are detected, among other things. For converting the received signal into the (originally transmitted) data, the receiver requires a time base, which includes suitable sampling instances with respect to the chips or symbol boundaries or a time offset or a frequency offset, for example.

FIG. 1 schematically illustrates a first time base sync1 and the second time base sync2 as a block in the diagram. To determine the first time base sync1 and the second time base sync2, a synchronization may be performed. In particular embodiments, for example, for the synchronization on the receiver side, initially a cross correlation between the received signal and the known preamble on the receiver side may be performed. The output signal of the cross-correlation has periodic maximum values that point out a correlation maximum in each case. A cross-correlation maximum is created with complete or almost complete overlapping of the preamble contained in the received signal and the known preamble on the receiving side for cross-correlation. For this reason, based upon the correlation maximums, a conclusion may be possible with respect to the symbol boundaries and the sampling instances of the chips for the first time base sync1 or for the second time base sync2.

FIG. 1 illustrates a schematic diagram in the time domain with the times $t_1$ to $t_{10}$ of the time t. The time bases sync1 and sync2 are represented in the bottom area. Above the time bases sync1 and sync2, symbols Sym1, Sym2, Sym3, Sym1', Sym2' are schematically represented as blocks in their temporal sequence. The symbol boundaries are represented by lines. For each symbol Sym1, Sym2, etc., eight RSSI values are output. Four RSSI values each may be averaged for an energy value $E_{t1}$, $E_{t2}$, $E_{t3}$, $E_{t4}$, $E_{t5}$.

In the center area of the schematic diagram in FIG. 1, the behavior of the energy value E(t) is represented over the time t for the times $t_1, t_2, t_3, t_4, t_5, t_6, t_7, t_8, t_9, t_{10}$, as an example. The behavior of the RSSI values is also represented as a dotted line.

In particular embodiments, the data of a frame are received at times $t_1, t_2$, and $t_3$. The associated energy values $E_{t1}, E_{t2}, E_{t3}$ are correspondingly low, because of the low signal field strength of the radio signal received. During the second half of the second symbol sym2, the signal field strength in the receiving channel and thus the RSSI value increase significantly. In the embodiment illustrated in FIG. 1, the increase of the signal field strength is contingent upon the start of the transmission of a further node in the wireless network of the received node. Because of the energy increase in the transmission channel, the energy value E(t) with the values $E_{t4}$ and $E_{t5}$ at the times $t_4$ and $t_5$ rises steeply. The energy value E(t) thereafter also remains at a higher level for the following additional times $t_6$, $t_7$, $t_8$, $t_9$, and $t_{10}$.

In the upper area of the schematic diagram, the behaviors of two difference values $\Delta E1(t)$, $\Delta E2(t)$ are represented with respect to the time t. The determination of the difference values $\Delta E1(t)$, $\Delta E2(t)$ is discussed in the following embodiments. A constant threshold S during the transmission is likewise schematically represented.

In particular embodiments of FIG. 1, a first energy value E(t−1) of the received signal and a second energy value E(t) of the received signal is determined during the reception of the frame FRX. The second energy value E(t), in particular embodiments, may be determined at an actual time t. The first energy value E(t−1), in particular embodiments, may be determined at a previous time t−1, however. The second energy value E(t) is therefore determined temporally after the first energy value E(t−1).

In particular embodiments, the following applies:

$$\Delta E1(t)=E(t)-E(t-1) \quad (1)$$

In particular embodiments, $\Delta E1(t)$ is a difference value that may be determined from the difference of the second energy value E(t) and the first energy value E(t−1). The difference value $\Delta E1(t)$ may be temporally determined immediately after the second energy value E(t) and is assigned to the time t of the second energy value E(t).

In particular embodiments, for a difference value $\Delta E1_{t5}$ for the time $t_5$ in FIG. 1, the following is applicable:

$$\Delta E1_{t5}=E_{t5}-E_{t4} \quad (2)$$

In particular embodiments, $t_5$ is the time to which the second energy value $E_{t5}$ and the difference value $\Delta E1_{t5}$ are assigned, and $t_4$ is the time to which the first energy value $E_{t4}$ is assigned.

In particular embodiments of FIG. 1, a first energy value E(t−2) of the received signal and a second energy value E(t) of the received signal may again be determined during the reception of the frame FRX. The second energy value E(t) also in particular embodiments may be the last temporal determination, assigned to the current time t. In particular embodiments, the first energy value E(t−2) may be determined for a time t−2 that precedes the current time t. Therefore, in the particular embodiments, a further determination for the time t−1 may occur between the determination of the first energy value E(t−2) at the second energy value E(t), which this not considered for the subtraction, however.

In particular embodiments, the following applies:

$$\Delta E2(t)=E(t)-E(t-2) \quad (3)$$

In particular embodiments, $\Delta E2(t)$ is a difference value that is determined from the difference of the second energy value E(t) and the first energy value E(t−2). The difference value $\Delta E2(t)$ may be assigned to the time t of the second energy value E(t).

For a difference value $\Delta E2_{t5}$ for the time $t_5$ in FIG. 1, for example, the following is applicable:

$$\Delta E2_{t5}=E_{t5}-E_{t3} \quad (4)$$

In particular embodiments, $t_5$ is the time to which the second energy value $E_{t5}$ and the difference value $\Delta E2_{t5}$ may be assigned, and $t_3$ is the time to which the first energy value $E_{t3}$ may be assigned.

FIG. 1 illustrates that the difference value $\Delta E2_{t5}$ exceeds threshold S at the time $t_5$. In other particular embodiments, the difference value $\Delta E1_{t5}$ does not exceed threshold S at the time $t_5$. Both embodiments may be combined with each other. A combined evaluation of the difference value $\Delta E1(t)$ of the first embodiment variant and the difference value $\Delta E2(t)$ of the second embodiment variant is performed by means of a logic. In particular embodiments, the results of the comparison of each comparison of the respective difference value $\Delta E1(t)$, $\Delta E2(t)$ may be linked with the threshold S for OR operation.

In particular embodiments, the first energy value $E_0$ (not shown) may be determined at the beginning of the transmission of the frame FRX and may be stored for the duration of the frame FRX, so that for the subtraction of the first energy value $E_0$ that is constant for the frame FRX is subtracted from the respective current second energy value E(t). The initial energy measurement at the start of the frame FRX and the comparison that is then performed continuously against the current energy value E(t), facilitate particular embodiments.

In particular embodiments in FIG. 1, the transgression of the threshold S at the time $t_5$ by the difference value $\Delta E2_{t5}$ may be determined by means of the comparison. Because of the transgression of the threshold S by the difference value $\Delta E2_{t5}$, the first time base sync1 may be erased. The reception of the third symbol Sym3 may be terminated by the erasure of the first time base sync1. The erasure of the first time base sync1 is indicated by an arrow following the time $t_5$. With the erasure of the first time base sync1, an erasure of the bits/data already received may be performed as well.

In particular embodiments, an idle mode ID follows the event of erasure of the first time base sync1. After the idle mode ID and a phase LI for listening in the transmission channel, a new synchronization on a preamble of the higher-energy signal FSI is performed, wherein a second time base sync2 is determined for the new symbols Sym1' and Sym2' of the new preamble.

Figure 2:
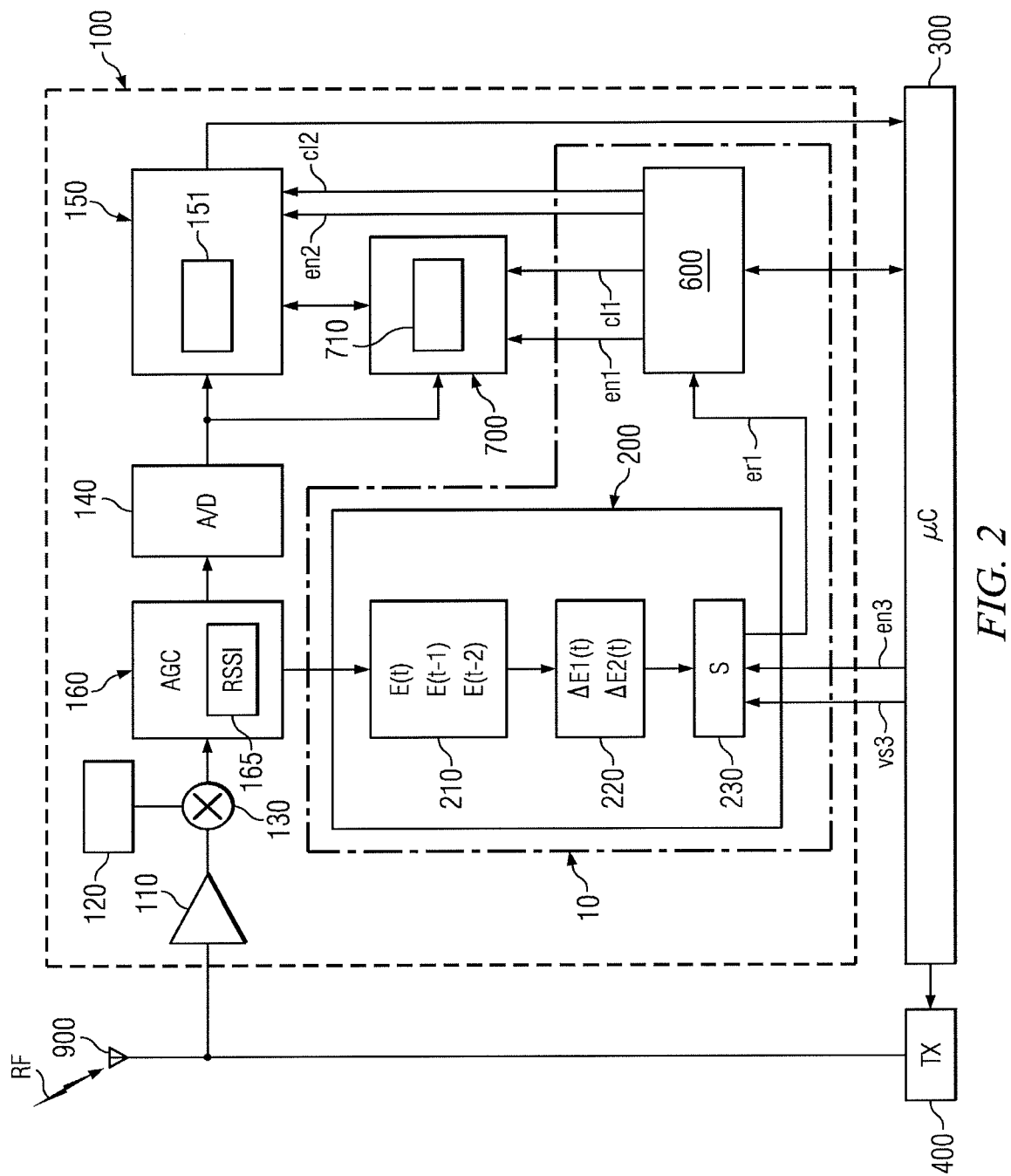
FIG. 2 is a schematic block diagram of an example node of an example wireless network.

In FIG. 2, a node of a wireless network is schematically represented by a block diagram. In particular embodiments, this node is designed for compliance with the industrial standard IEEE 802.15.4. The node has an antenna 900 for receiving the RF radio signal, a receiver (RX) 100 that may be connected with the antenna 900, a transmitter (TX) 400 that may be connected with the antenna 900, and a data processor 300 that may be connected with the receiver 100, which are represented as a functional block in FIG. 2. In particular embodiments, the receiver 100 may be monolithically integrated on a semiconductor chip. The data processor 300 may be designed as a microcontroller uC, for example. Particular embodiments relate to a receiver 100, so that the transmitter 400 and the data processor 300 are not represented in greater detail.

In particular embodiments, the receiver 100 has an input amplifier 110 in the receiving path that may be connected with the antenna 900, a local oscillator 120, a mixer 130, an Automatic Gain Control (AGC) 160, an analog-digital converter (ADC) 140, and a digital circuit 150, wherein the digital circuit 150 provides the received data at the input of the data processor 300. The digital circuit 150 is set up for detection of received data of a frame FRX.

In particular embodiments, the receiver has a synchronization unit 700. The synchronization unit 700 is set up to determine a first time base sync1 by synchronization. The synchronization unit 700 is setup to determine suitable sampling instances with respect to the chips, symbol boundaries, a time offset, or a frequency offset for the first time base. In particular embodiments, for synchronization, the synchronization unit 700 may have a synchronization correlator 710 which is designed as a cross correlation filter. If the receiver 100 receives a preamble, the received signal is initially supplied to the synchronization correlator 710, which performs the correlation between the received signal and the known preamble on the receiver side. The output signal of the synchronization correlator 710 has periodic maximum values that point out a correlation maximum in each case. A correlation maximum may be created during complete or almost complete overlapping of the received signal contained in the preamble and the preamble that is used on the receiver side for correlation, so that based upon the correlation maximums conclusions may be made with respect to the respective symbol boundary and to the sampling instances of the chips.

In particular embodiments, the digital circuit 150 may be set up to demodulate the received signal and to detect the data. The digital circuit 150, in addition to using sequences on the receiver side for de-spreading the received signal, also has a correlator 151. The received signal may be correlated by means of the correlator 151, using known PN sequences on the receiver side. In particular embodiments, the digital circuit performs the demodulation, de-spreading, and detection, using the first time base sync1 for the received data of the frame FRX.

In particular embodiments, the receiver 100 may have an evaluation device 10, which is setup for controlling the digital circuit 150 and the synchronization unit 700. The evaluation circuit 10 does not require any interaction with the data processor 300 for this purpose. The control by the evaluation circuit may therefore not be performed in the physical (PHY) layer of the OSI model. The evaluation circuit 10 may be connected with the data processor 300 via an interface.

In particular embodiments, the evaluation device 10 comprises a destination circuit 200. In FIG. 2, the destination circuit 200 may be connected with the Automatic Gain Control 160. The Automatic Gain Control 160 may provide RSSI values on the input of the destination circuit 200. The RSSI values may be determined by the Automatic Gain Control 160, using the signal field strength of the RF radio signal. In particular embodiments, for example, in a first functional block 210 of the destination circuit 200, a first energy value $E(t-1)$, $E(t-2)$, and a second energy value $E(t)$ may be determined by averaging four RSSI values. In particular embodiments, in a second functional block 220 of the destination circuit 200, a difference value $\Delta E1(t)$, $\Delta E2(t)$ may be determined, corresponding to formulas (1) and (3). In particular embodiments, in a third functional block 230 of the destination circuit 200, the difference value $\Delta E1(t)$, $\Delta E2(t)$ may be compared with the threshold S. If the difference value $\Delta E1(t)$, $\Delta E2(t)$ exceeds the threshold S, the destination circuit 200 outputs a first error signal er1. The threshold S may be adjusted by the data processor 300 by means of the signal vs3. The comparison may be activated and deactivated by the destination circuit 200 by the control signal en3.

In particular embodiments, the evaluation device 10 may have a control circuit 600 on the input of which the first error signal er1 may be input. The control circuit 600 may be connected with the synchronization unit 700 for controlling the synchronization unit 700. To start a first synchronization, the control circuit 600 may trigger the activation of the synchronization unit 700 by the control signal en1. A preceding temporal synchronization may be erased in that the control circuit 600 transmits an erase signal cl1 to the synchronization unit 700. If the time basis sync1, sync2 was determined by the synchronization unit 700, the time basis sync1, sync2 is recorded, in that the further synchronization may be activated from the control circuit 600 by the control signal en1.

In FIG. 2, the control circuit 600 moreover controls the digital circuit 150 by the control signal en2 and the erase signal cl2. The reception of the current frame may be aborted by means of the control signal en2. Any bits that were already received may be erased by means of the erase signal cl2.

Figure 3:
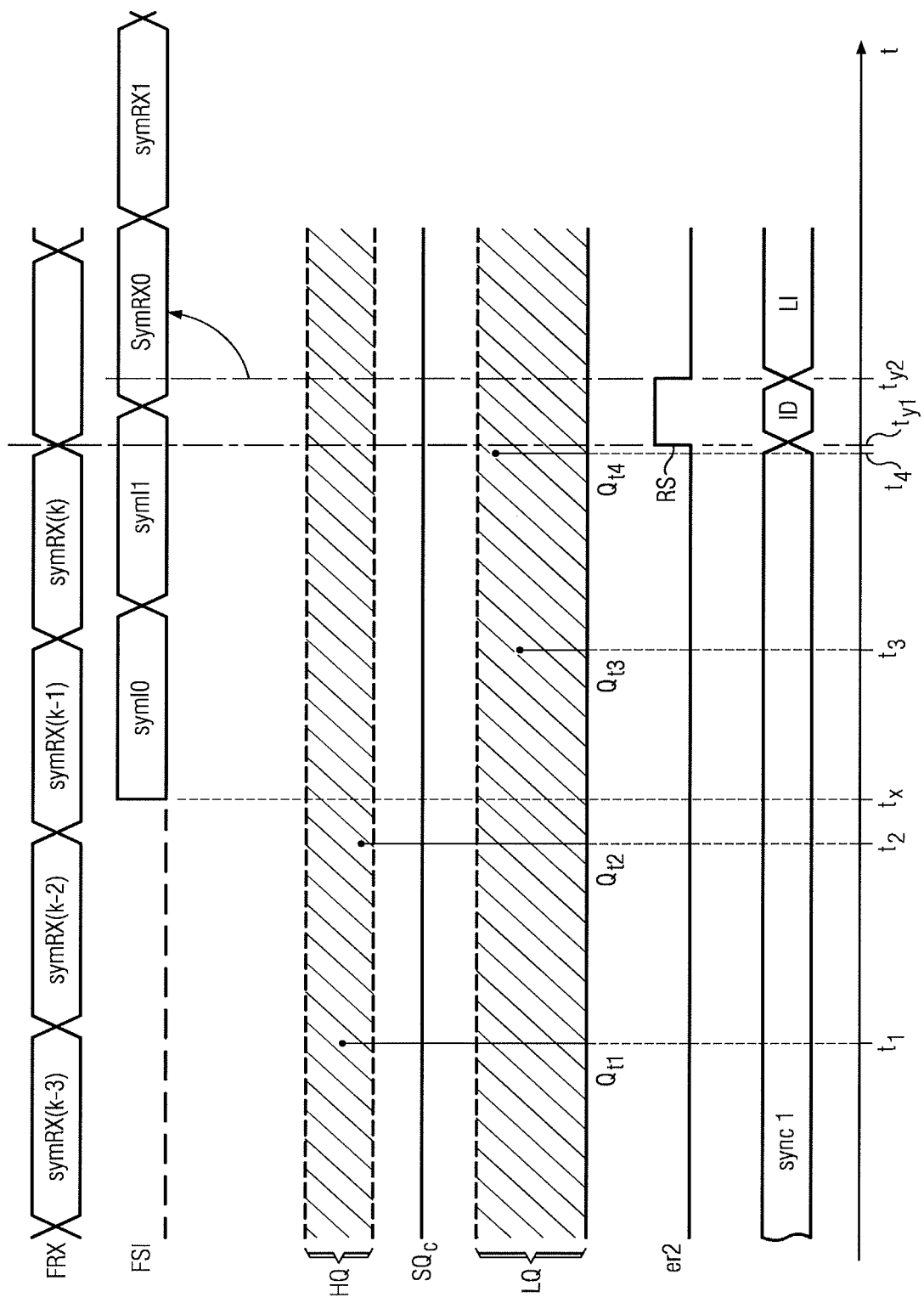
FIG. 3 is a schematic diagram with example quality values determined.
Figure 4:
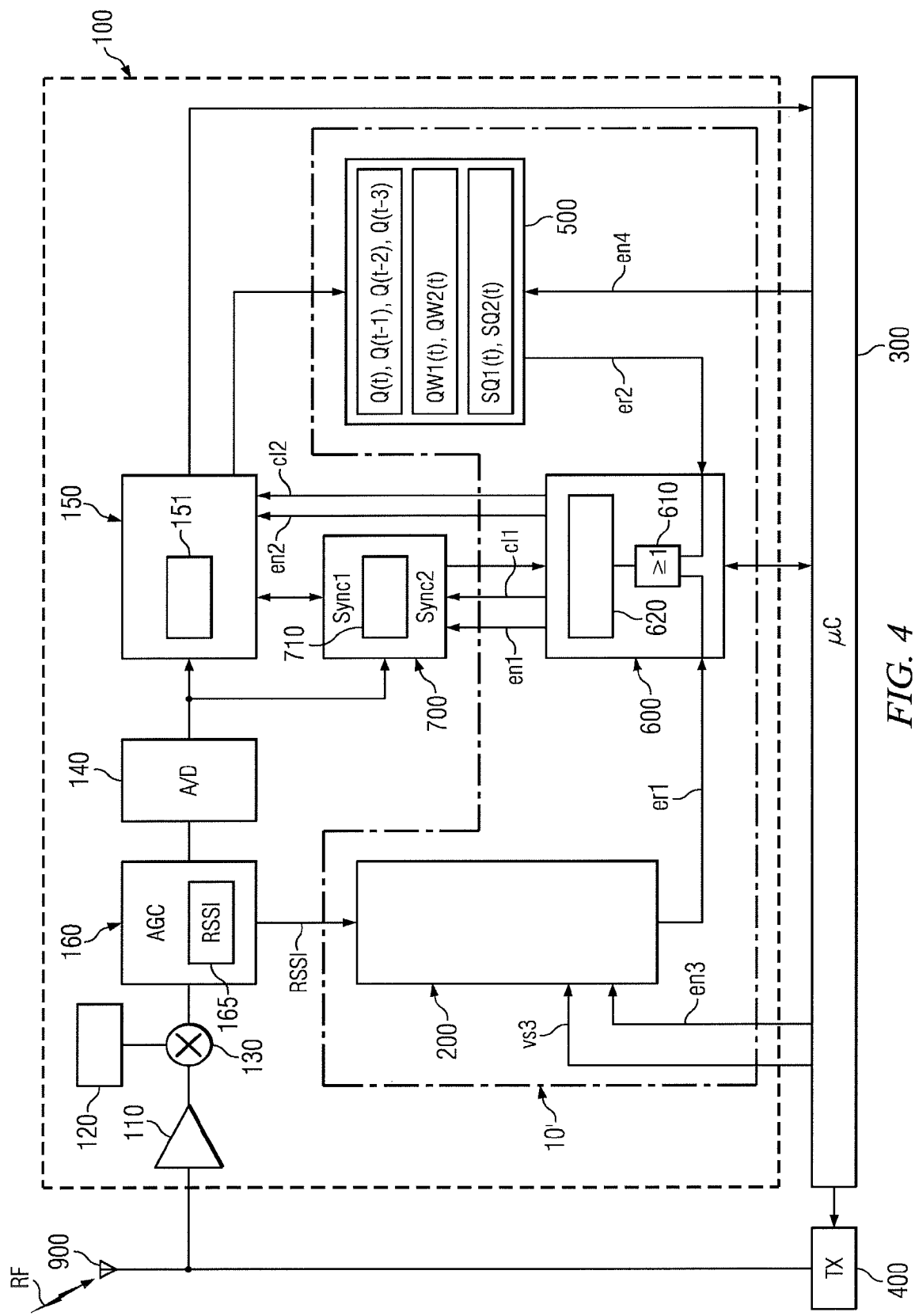
FIG. 4 is a schematic block diagram of another example node of an example wireless network.

FIGS. 3 and 4 illustrate embodiments in which a quality value QW1(t) or QW2(t) of the received signal is determined continuously during the reception of a frame FRX. The quality value QW1(t), QW2(t) may be determined from the signal-to-noise ratio, for example. In FIGS. 3 and 4, the quality value QW1(t), QW2(t) may be determined from maximum values of an output signal of a correlator.

In particular embodiments, the output signal of the correlator may have maximum values that point out a correlation maximum in each case. A correlation maximum may be created with complete or almost complete overlapping of the sequence of a symbol contained in the received signal and the sequence on the receiving side that was used for correlation. For this reason it is possible to draw conclusions in terms of the respective symbol, and thus also in terms of the bits assigned to the symbol, based upon the correlation maximums that may be detected, for example, by means of a threshold value detector.

In particular embodiments, deterioration in quality, i.e. in the characteristics of the transmission channel, such as an interfering radio signal of a further node, multipath propagation, or channel noise produce a reduction of the output signal for the correlation maximums at the output of the correlator. The respective output value for a correlation maximum is subsequently used as a quality measuring value Q(t). By evaluating the output signal of the correlator, it is therefore possible to determine the quality value QW1(t), QW2(t) from one or multiple quality measuring values Q(t).

In FIG. 3, a quality value QW1(t) corresponds to a current quality measuring value Q(t), so that the following may apply:

$$QW1(t)=Q(t) \tag{5}$$

In FIG. 3, a quality threshold SQ1(t) may be calculated, in which the following applies:

$$SQ1(t) = \frac{Q(t-3)}{2} \tag{6}$$

In particular embodiments, the temporal variable quality threshold is SQ(t), which is assigned to the time t of the current quality value QW1(t). The quality measuring value $Q(t-3)$ is the third temporal predecessor of the current quality measuring value Q(t).

In particular embodiments, with the quality value QW1(t) and the quality threshold SQ1(t), a bigger/smaller comparison is performed and it is determined whether the quality value QW1(t) is below the quality threshold SQ1(t). Between the current quality measuring value Q(t) and the third predecessor $Q(t-3)$, two further quality measuring values $Q(t-1)$ and $Q(t-2)$ are determined, which are not considered for the comparison in the particular embodiments of FIG. 3, however.

For the time $t_4$, for example, the following is applicable:

$$QW1_{t4}=Q_{t4} \tag{7}$$

and $$SQ1_{t4} = \frac{Q_{t1}}{2} \tag{8}$$

In particular embodiments, the quality value QW1(t) is compared with the quality threshold SQ1(t). If the quality value $QW1_{t4}$ drops below the quality threshold $SQ1_{t4}$ for the time $t_4$, the first time base sync1 is erased during the reception of the frame FRX. After an idle mode ID and a phase LI for listening in the transmission channel, a renewed synchronization to determine a second time base is started.

In FIG. 3, a quality value QW2(t) may be determined by addition of the current quality measuring value Q(t) and the preceding temporal quality measuring value Q(t−1), so that the following applies:

$$QW2(t)=Q(t)+Q(t-1) \quad (9)$$

In particular embodiments illustrated in FIG. 3, a temporal variable quality threshold SQ2(t) corresponds to a (temporal) third predecessor Q(t−3) of the current quality measuring value Q(t), so that the following applies:

$$SQ2(t)=Q(t-3) \quad (10)$$

For the time $t_4$, for example, the following is applicable:

$$QW2_{t4}=Q_{t4}+Q_{t3} \quad (11)$$

and $$SQ2_{t4}=Q_{t1} \quad (12)$$

In particular embodiments, the quality value QW2(t) is compared with the quality threshold SQ2(t). If the quality value $QW2_{t4}$ drops below the quality threshold SQ2, for the time $t_4$, the first time base sync1 is erased during the reception of the frame FRX. After an idle mode ID and a phase LI for listening in the transmission channel, a renewed synchronization to determine a second time base is also started here.

FIG. 3 shows how the quality measuring values $Q_{t1}$ and $Q_{t2}$ are determined in an area HQ of high quality. But in particular embodiments, the quality measuring values $Q_{t3}$ and $Q_{t4}$ are determined in an area LQ of lower quality. In particular embodiments, between the times $t_3$ and $t_4$, a symbol symIO of a further node may be transmitted, which interferes with the reception of the symbols symRX(k−1), symRX(k) of the previously received frame FRX.

In particular embodiments, when the quality value QW1(t), QW2(t) drops below the quality threshold SQ1(t), SQ2(t), this may trigger a reset signal RS with skirts at the times $t_{y1}$ and $t_{y2}$, which results in the reception of the current frame FRX being aborted. In particular embodiments, the symbols symRX0, symRX1 of the further node following the reset signal RS may be used for synchronization for a second time base.

In particular embodiments, a specified constant quality threshold SQ may be used. In particular embodiments, the quality value QW1(t) may correspond to the current quality measuring value Q(t), so that the following is applicable again:

$$QW1(t)=Q(t) \quad (13)$$

In particular embodiments, the constant quality threshold $SQ_c$ and the comparison with the constant quality threshold $SQ_c$ which is then continuously performed for the current quality value QW1(t), facilitate a particularly simple implementation.

In FIG. 4, the evaluation device 10' is changed compared to FIG. 2. The evaluation device 10' of FIG. 4 has a determination circuit 500, the input of which may be connected to the digital circuit 150. In particular embodiments, the output signal of the correlator 151 of the digital circuit 150 is applied on the input of the determination circuit 500. The determination circuit 500 has multiple functional blocks, in which quality measuring values Q(t), a quality value QW1(t), QW2(t) according to one of the formulas (5) or (9), as well as a quality threshold SQ1(t) or SQ2(t), are determined pursuant to one of the formulas (6) or (10). In particular embodiments, the determination circuit 500 is set up to compare the quality value QW1(t), QW2(t) with the associated quality threshold SQ1(t) or SQ2(t). If the quality value QW1(t), QW2(t) drops below the associated quality threshold SQ1(t) or SQ2(t), the determination circuit 500 outputs a second error signal er2. Using the second error signal er2, the control circuit may cause the reception of a current frame FRX to be aborted, the first time base sync1 to be erased, and the synchronization to be started to determine a second time base sync2, such as is described in accordance with the previous Figures. In particular embodiments, the control signal en4 sets up the data processor 300 to activate or to deactivate the determination circuit 500.

In particular embodiments illustrated in FIG. 4, it is possible that the evaluation device 10' has the determination circuit 500 exclusively. In particular embodiments, no evaluation of the RSSI values may be performed.

In particular embodiments illustrated in FIG. 4, the evaluation device 10' has both the determination circuit 500 as well as the destination circuit 200. In order to be able to evaluate the first error signal er1 of the destination circuit 200 and the second error signal erg of the determination circuit 500 in combination, the control circuit 600 may have a logic 610, on the inputs of which the error signals er1 and er2 are applied. In particular embodiments, the logic may be designed as an OR operation. The OR operation causes that the threshold. S is either exceeded by the difference value ΔE1(t) or ΔE2(t), or that if the quality value QW1(t) or QW2(t) drops below the quality threshold SQ1(t), SQ2(t), the first time base sync1 may be erased and a renewed synchronization may be done. The control circuit 600 may in addition have a state machine 620 for temporal control of the process steps for the output of the control signals en1, en2, and the erase signals cl1, cl2.

Particular embodiments are not limited to embodiments represented in FIGS. 1 to 4. Particular embodiments provide a receiver for a wireless network of another industrial standard (Bluetooth, WLAN). Particular embodiments modify the receiver, so that further functional blocks are interposed in the receiver. The functionality of the node pursuant to FIG. 4, however, may be used particularly for a wireless network of the industrial standard IEEE 802.15.4.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

The invention claimed is:

1. A method comprising, at a receiver:
   receiving a signal with an antenna;

conducting synchronization of the signal to determine a first time base, the first time base defining a first temporal period for data detection;

determining a particular value associated with the signal in the first temporal period; and renewing synchronization of the signal based on a comparison between the particular value and a predetermined threshold value to determine a second time base, the second time base defining a second temporal period for data detection.

2. The method of claim 1, further comprising:

determining a first energy value of the received signal by averaging received signal strength indication (RSSI) values of the received signal over a first period of time;

determining a second energy value of the signal by averaging RSSI values of the received signal over a second period of time;

determining a difference value between the first energy value and the second energy value exceeds a predetermined energy threshold value; and renewing synchronization to determine the second time base in response to the difference value exceeding the predetermined energy threshold value.

3. The method of claim 2, wherein the difference value is determined by subtracting the first energy value from the second energy value.

4. The method of claim 2, wherein the energy threshold value is determined by using previous values for the first and second energy values of the received signal.

5. The method of claim 1, further comprising:

determining a quality value of the signal by correlating binary chips in the signal with chips of a sequence;

determining that the quality value of the signal is below a predetermined quality threshold value; and renewing synchronization to determine the second time base in response to the quality value being below the predetermined quality threshold value.

6. The method of claim 5, wherein the quality threshold value is determined using previous valued for the quality value of the signal.

7. The method of claim 1, wherein the first temporal period includes a plurality of periods of time, and the method further comprising: for each of the plurality of periods of time, determining a respective value associated with the signal in the period of time.

8. The method of claim 1, wherein conducting synchronization of the signal to determine a first time base comprises:

performing a cross-correlation between the received signal and a preamble on the receiver side; and determining symbol boundaries and sampling instances of binary chips for the first time base based on a maximum of the cross-correlation.

9. The method of claim 1, wherein the particular value comprises a difference value between a first energy value and a second energy value, and the predetermined threshold valued comprises a predetermined energy threshold value, and wherein renewing synchronization of the signal comprises renewing synchronization of the signal based on a determination of the difference value exceeding the predetermined energy threshold value.

10. The method of claim 1, wherein the particular value comprises a quality value, and the predetermined threshold value comprises a predetermined quality threshold value, and wherein renewing synchronization of the signal comprises renewing synchronization of the signal based on a determination of the quality value being below the predetermined quality threshold value.

11. A device comprising:

an antenna configured to receive a signal; and a receiver coupled to the antenna, the receiver being operable to:

conduct a first synchronization of the signal to determine a first time base, the first time base defining a first temporal period for data detection;

determine a particular value associated with the signal in the first temporal period; and renew synchronization of the signal based on a comparison between the particular value and a predetermined threshold value to determine a second time base, the second time base defining a second temporal period for data detection.

12. The device of claim 11, wherein the receiver is further operable to:

determine a first energy value of the received signal by averaging received signal strength indication (RSSI) values of the received signal over a first period of time;

determine a second energy value of the received second signal by averaging RSSI values of the received signal over a second period of time;

determine a difference value between the first energy value and the second energy value exceeds a predetermined energy threshold value; and renew synchronization to determine the second time base in response to the difference value exceeding the predetermined energy threshold value.

13. The device of claim 12, wherein the difference value is determined by subtracting the first energy value from the second energy value.

14. The device of claim 12, wherein the energy threshold value is determined by using previous values for the first and second energy values of the signal.

15. The device of claim 11, wherein the receiver is further operable to:

determine a quality of the signal by correlating binary chips in the signal with chips of a sequence;

determine that the quality value of the signal is below a predetermined quality threshold value; and renew synchronization to determine the second time base in response to the quality value being below the predetermined quality threshold value.

16. The device of claim 15, wherein the quality threshold value is determined using previous values for the quality value of the signal.

17. One or more computer-readable non-transitory storage media embodying logic that is configured when executed to:

conduct a first synchronization of the signal to determine a first time base, the first time base defining a first temporal period for data detection;

determine a particular value associated with the signal in the first temporal period; and renew synchronization of the signal based on a comparison between the particular value and a predetermined threshold value to determine a second time base, the second time base defining a second temporal period for data detection.

18. The computer-readable non-transitory storage media of claim 17, further comprising logic configured when executed to:

determine a first energy value of the received signal by averaging received signal strength indication (RSSI) values of the received signal over a first period of time;

determine a second energy value of the received second signal by averaging RSSI values of the received signal over a second period time;

determine a difference value between the first energy value and the second energy value exceeds a predetermined energy threshold value; and renew synchronization to determine the second time base in response to the difference value exceeding the predetermined energy threshold value.

19. The computer-readable non-transitory storage media of claim 18, wherein the difference value is determined by subtracting the first energy value from the second energy value.

20. The computer-readable non-transitory storage media of claim 18, wherein the energy threshold value is determined by using previous values for the first and second energy values of the signal.

21. The computer-readable non-transitory storage media of claim 17, further comprising logic configured when executed:
determine a quality value of the signal by correlating binary chips in the signal with chips of a sequence;
determine that the quality value of the signal is below a predetermined quality threshold value; and
renew synchronization to determine the second time base in response to the quality value being below the predetermine quality threshold value.

22. The computer-readable non-transitory storage media of claim 21, wherein the quality threshold value is determined using previous values for the quality value of the signal.

* * * * *

UNITED STATES PATENT AND TRADEMARK OFFICE
CERTIFICATE OF CORRECTION

PATENT NO. : 9,246,605 B2  Page 1 of 1
APPLICATION NO. : 14/257473
DATED : January 26, 2016
INVENTOR(S) : Tilo Ferchland et al.

It is certified that error appears in the above-identified patent and that said Letters Patent is hereby corrected as shown below:

In the specification,

Column 1, Line 58; Delete "psuedonoise" and insert -- pseudonoise --, therefor.

Column 11, Line 21; Delete "$QW2_{t4}-Q_{t4}$" and insert -- $QW2_{t4}=Q_{t4}$ --, therefor.

Column 11, Line 28; Delete "$SQ2$," and insert -- $SQ2_{t4}$ --, therefor.

Column 11, Line 50; Delete "SQ" and insert -- $SQ_c$ --, therefor.

Column 12, Line 27; Delete "erg" and insert -- er2 --, therefor.

Column 12, Line 31; Delete "threshold." and insert -- threshold --, therefor.

In the claims,

Column 13, Line 39; In Claim 6, delete "valued" and insert -- values --, therefor.

Column 14, Line 37; In Claim 15, after "quality" insert -- value --.

Column 14, Line 67; In Claim 18, after "period" insert -- of --.

Column 15, Line 15; In Claim 21, delete "executed:" and insert -- executed to: --, therefor.

Column 15, Line 21-22; In Claim 21, delete "predetermine" and insert -- predetermined --, therefor.

Signed and Sealed this
Tenth Day of May, 2016

Michelle K. Lee
*Director of the United States Patent and Trademark Office*